Oct. 22, 1946.  A. W. LANE  2,409,634
GYROSCOPIC CONTROLLING MEANS
Filed Jan. 19, 1943   2 Sheets-Sheet 1
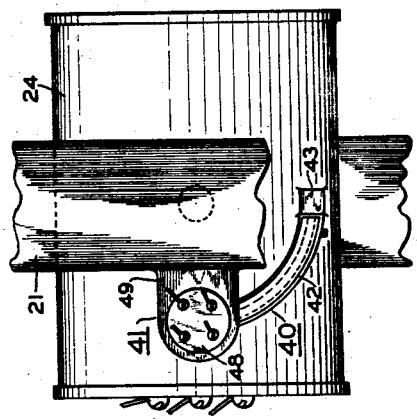
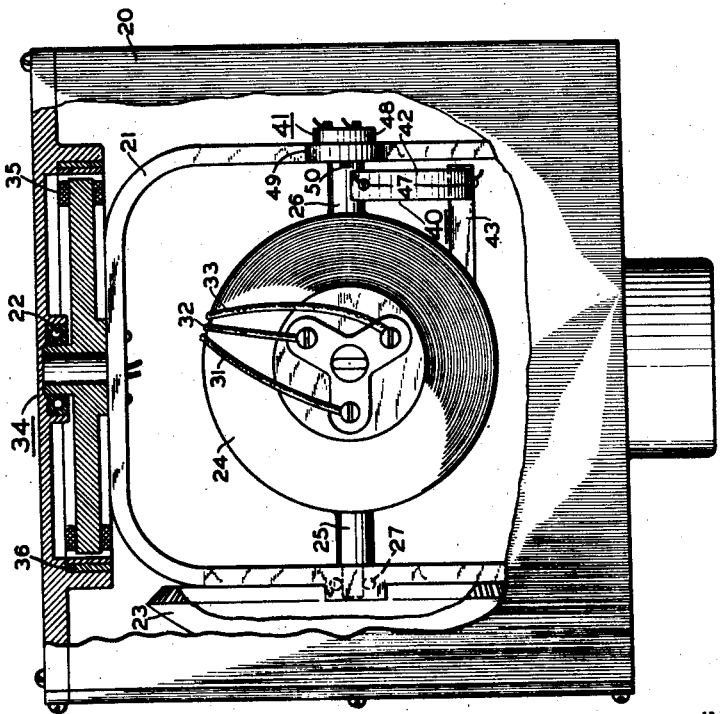
INVENTOR
A.W. LANE
BY
*Herbert H. Thompson*
his ATTORNEY.

Oct. 22, 1946.   A. W. LANE   2,409,634
GYROSCOPIC CONTROLLING MEANS
Filed Jan. 19, 1943   2 Sheets-Sheet 2

INVENTOR
A.W. LANE
BY
Herbert H. Thompson
his ATTORNEY.

Patented Oct. 22, 1946

2,409,634

UNITED STATES PATENT OFFICE 2,409,634

GYROSCOPIC CONTROLLING MEANS

Arthur W. Lane, Freeport, N. Y., assignor to Sperry Gyroscope Company, Inc., Brooklyn, N. Y., a corporation of New York Application January 19, 1943, Serial No. 472,912

5 Claims. (Cl. 74—5)

This invention generally relates to gyroscopic controlling means and more particularly is directed to a thermal means which operates to control an electrically effective torque exerting device.

One of the features of the invention resides in the provision of a thermal couple that forms a selective means for controlling a gyroscopic instrument.

Another feature of the invention consists in the provision of a thermally responsive reversing switch which forms one of the parts of the novel thermal couple or thermally cooperable pair of elements.

Other features and structural details of the invention will be apparent from the following description when read in relation to the accompanying drawings, wherein Fig. 1 is a side elevation view of a gyroscopic instrument of the directional gyro type constructed in accordance with the teaching of the present invention, the casing of the instrument being partly shown in section.

Fig. 2 is a detail side elevation view of the rotor case and vertical ring taken perpendicularly to the showing thereof in Fig. 1.

Figure 4:
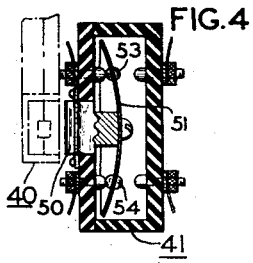
Fig. 4 is an enlarged detail cross section view of the torque motor controlling thermally coupled parts of improved selective means.
Figure 5:
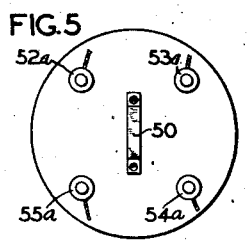
Fig. 5 is a detail front view of the switch part of the couple shown in Fig. 4.

With particular reference to Fig. 1, a gyroscope instrument of the directional type which may or may not be slaved to or controlled by a magnetic compass is employed to illustrate the present inventive concepts. The conventional parts of this well-known instrument shown in the drawings include an outer casing 20 within which a vertical ring 21 is suitably mounted for pivotal movement. As shown in the present instance, this mounting may be provided by two axially spaced bearings, one of which is indicated at 22, Fig. 1, in the upper wall of the casing 20. Ring 21 controls the movement of a conventional type of compass card (not shown) which is moved by means of the crown gear 23. Crown gear 23 meshes with a bevel gear (not shown) which forms the base of the vertical ring 21. Suitable means (not shown) are provided to take the gravitational thrust of the vertical ring and the gyroscopic parts mounted thereon.

Figure 10:
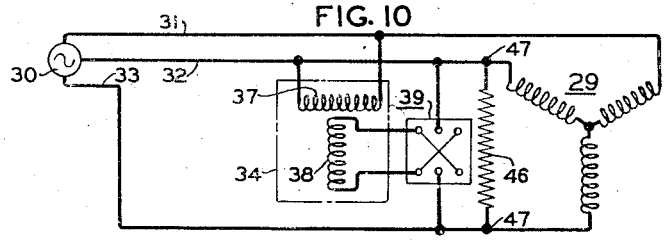
Fig. 10 is a circuit diagram showing the electrical connections and arrangement of the coupled parts of the depicted gyro instrument.
Figure 3:
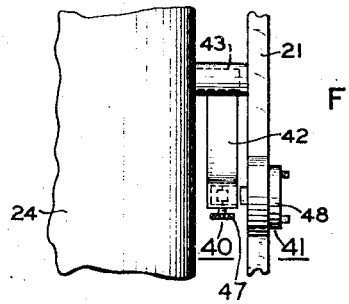
Fig. 3 is a detail plan view of the novel parts shown in Figs. 1 and 2.

With reference also to Figs. 2 and 3, the rotor bearing case or frame of the described type of gyroscopic instrument is indicated at 24. The case is mounted in a conventional manner between the upwardly extending arms of the vertical ring 21, by means such as trunnions 25 and 26 and suitable bearings, one of which is indicated at 27. The thus defined tilt axis of the case 24 for the instrument illustratively embodying the present inventive concepts is horizontal and is perpendicular to the axis of the ring 21. A gyro rotor (not shown) is mounted within the rotor bearing case 24 in any conventional manner. The spin axis of the rotor normally lies in a horizontal plane which includes the axis of the case 24, the rotor axis, case axis and ring axis normally being mutually perpendicular. This arrangement of the axes of the respective parts of the gyroscopic instrument shown is of a character conventionally employed in directional gyros. The gyro rotor may be spun by means of a suitable motor (not shown) of the squirrel cage induction type, which includes a wound stator (not shown) fixed to a shaft (not shown) within the case 24 that defines the spin axis of the gyro rotor. As shown in Fig. 10, the stator of such a motor may be three phase wound, the windings of the same being indicated at 29, in Fig. 10. As shown in this figure, windings 29 are suitably energized from an alternating current source 30 by way of leads 31, 32 and 33.

The means provided in the present instance for exerting a torque about one of the axes of universal mounting of the case 24, and particularly as shown, for exerting a torque about the axis of the ring 21 to cause precession of the case to correct tilt of the case about its horizontal axis is a conventional type of torque motor indicated generally at 34. This electrical or motive device for exerting a torque may be of the squirrel cage type of torque motor having a wound, movable stator 35, Fig. 1, and an inductive rotor 36 that is fixed in the upper wall of the casing 26. As shown, the stator 35 is fixed to the vertical ring 21, the motor being effective in the present instance, to exert a torque about the axis of the ring to precess the case 24 in a direction to correct for the tilt thereof about its horizontal axis. As shown in Fig. 10, the stator 35 of the motor 34 may be two phase wound, one of the windings as noted at 37 being connected across leads 31 and 32 by which energy is continuously supplied the windings 29 of the gyro rotor spinning motor. The other winding 38 of the reversible torque motor is connected across leads 32 and 33 and is energized by way of a switch diagrammatically indicated at 39, in Fig. 10, of double throw, double pole construction.

The novel thermally operable switch employed in the described type of gyro instrument is responsive to tilt of the case from a normal position about its horizontal axis. A controller constructed in accordance with the present invention detects tilt of the universally mounted rotor bearing case from a normal position and is effective to control the selective operation of the described electrical torque exerting device to correct such tilt. The controller, as shown, includes two relatively movable parts which are thermally coupled and comprise a heat radiator generally indicated at 40 and a thermally responsive reversing switch which is also generally indicated at 41.

As shown in Figs. 1, 2, 3, 4 and 9, particularly, the radiator 40, which forms the actuating member of the couple, is constructed of a curved, open sided, tubular cover piece 42 of heat insulating material that is fixedly mounted on the case 24 by means of a spacer lug 43. The top of the tubular cover 42 is provided with a heat insulating cap 44. Abutting heat conducting elements 45 of a shape similar to the cover are fitted within the shield forming cover. An electrical resistor 46 is situated in an opening provided between the heat conducting elements 45, energy being continuously fed to the same by way of terminals 47 which are connected across leads 32 and 33 as shown in Fig. 10.

With reference to Figs. 1, 2, 3 and 4, the curved open side of the heat radiator 40 is adjacent to the vertical ring 21 which in turn includes the thermal switch 41. In the present instance, the radiator 40 being mounted on the case 24 moves relatively to the switch 41 as tilt of the case occurs. The thermally responsive switch, shown in detail in Figs. 4, 5, 6, 7 and 8, includes a casing or cover 48 of cylindrical shape constructed of electrically non-conductive material. The casing 48 is fixedly mounted in an opening in a laterally extending boss 49 on the vertical ring 21, Fig. 2. The sensitive element of the switch is fixedly mounted on a post 50 of heat conducting material that is secured to the front wall of the casing 48. The end of the post 50 extends out of the casing to a fixed position adjacent the open side of the actuating member or heat radiator of the thermal couple. The relation of these parts is clearly shown in Figs. 1, 2, 3 and 4, it being apparent that either the supply of heat or its lack of supply from the heat radiator to the post 50 is effective to control the switch. When the case 24 is normally positioned, the cap 44 of the radiator is adjacent the extending end of the heat conducting post 50 as clearly shown in Fig. 1.

Figure 8:
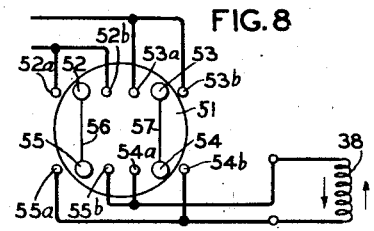
Fig. 8 is a diagrammatic viewing showing the electrical connections of the thermally responsive switch illustrated in Figs. 4 to 7, inclusive.
Figure 6:
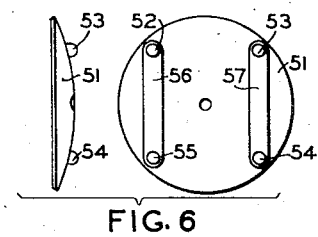
Fig. 6 illustrates a detail front and side view of the sensitive element of the switch shown in Fig. 4.
Figure 9:
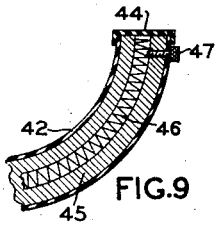
Fig. 9 is a detail cross section of the heater element of the thermally coupled parts employed to effect operation of the selective switch.

The heat sensitive control element of the switch is constructed in the form of a bi-metallic disc indicated generally at 51. The disc 51 includes suitable electrical contact providing pieces such as indicated at 52, 53, 54 and 55 that are insulated from the disc proper. Current conducting strips 56 and 57, respectively, connect contacts 52—55 and 53—54. Two terminals are provided for receiving each of the noted contacts, four of the terminals being mounted in the front wall of the switch casing 48 and the other four being mounted in the rear wall. The front casing wall carries terminals 52a, 53a, 54a and 55a, and the rear wall carries terminals 52b, 53b, 54b and 55b. In operation, bi-metallic disc 51 moves with a snap action responsive to the heat radiator and positions the contacts 52 to 54, inclusive, in either of their terminal engaging (a) or (b) positions. As shown in Fig. 10, energy may be supplied the switch by connecting the same across leads 32 and 33. In Fig. 8, the energy is shown as fed to the switch by way of terminals 52 (a and b) and 53 (a and b) and is withdrawn from the switch by way of terminals 55 (a and b) and 54 (a and b) which in turn lead to the control winding 38 of the torque motor 34. The switch functions as a double throw, double pole electrical switch in reversing the direction of flow of the energy in winding 38. When the disc 51 is positioned as shown in Fig. 4, the energy flows through the winding 38 in the direction of the upwardly pointed arrow in Fig. 8. When the disc is situated in its other position, the energy flows through the winding 38 in the direction of the downwardly pointed arrow, also shown in Fig. 8. It will be understood that the torque exerting motive means is continuously effective to move the case in a direction to return the same to a tilt free condition about its horizontal axis.

Figure 7:
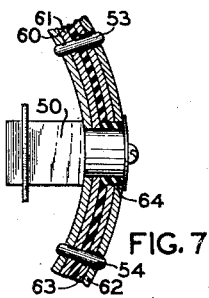
Fig. 7 is an enlarged cross section view of the sensitive element of the switch in which the thickness of the individual thermal discs shown therein is exaggerated in order to clearly indicate the arrangement thereof.

Fig. 7 shows the detail construction of disc 51, the heat sensitive bi-metallic parts of the same being directly mounted on the inwardly positioned end of the heat conducting post 50. The disc parts 60 and 61 are suitably connected together and being metals of different coefficients of thermal expansion control the positioning of the sensitive element of the switch. To compensate the sensitive element for ambient temperature change, similar discs 62 and 63 arranged in opposed relation to the control discs may also be mounted on the post 50. These last noted discs are suitably connected and are further insulated from the post 50 and the other discs by means of the insulating sleeve 64 and insulating disc 65. All of the discs in Fig. 7 are considerably enlarged to facilitate illustration.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an instrument having a member movable about an axis, means operable to move the member about the axis in a clockwise or counterclockwise direction, a thermally cooperable pair of elements comprising a heat radiator and a heat responsive switch having two positions, said elements being mounted respectively on relatively movable parts of the instrument with one thereof being fixed to the member to move therewith with movement about its axis, said switch operating responsive to said radiator to control the moving means to move the member clockwise in one of its positions and to move the member counterclockwise in the other of its positions.

2. An instrument as claimed in claim 1, in which the element fixed to the member is the heat radiator.

3. In a gyroscopic instrument having a gimbal ring, a rotor frame pivotally supported on the ring for movement about an axis, means for precessing the frame in a clockwise or counterclockwise direction about its axis, a thermally cooperable pair of elements comprising a heat radiator and a heat responsive switch having two positions, said elements being mounted respectively on relatively movable parts of the instrument with one thereof being fixed to the rotor frame to move therewith about its axis, said switch operating responsive to said radiator to control the precessing means to precess the frame clockwise in one of its positions and to precess the frame counterclockwise in the other of its positions.

4. An instrument as claimed in claim 3, in which the radiator and switch elements are respectively mounted on the frame and ring.

5. In a directional gyro instrument having a vertical ring, a rotor frame pivotally supported on the ring for movement about a horizontal axis, means for precessing the frame about its axis, a thermally cooperable pair of elements comprising a heat radiator and a heat responsive switch having two positions, said radiator being mounted on the frame and said switch being mounted on the ring to move relative to one another with tilt of the frame about its horizontal axis, said switch operating responsive to said radiator to control the precessing means to precess the frame clockwise in one of its positions and to precess the frame counterclockwise in the other of its positions.

ARTHUR W. LANE.